(12) United States Patent
Meunier

(10) Patent No.: US 7,916,972 B2
(45) Date of Patent: Mar. 29, 2011

(54) LANDMARK-BASED FORM READING WITH DECLARATIVE LANGUAGE

(75) Inventor: Jean-Luc Meunier, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 1190 days.

(21) Appl. No.: 11/496,697

(22) Filed: Jul. 31, 2006

(65) Prior Publication Data

US 2008/0025608 A1    Jan. 31, 2008

(51) Int. Cl.
| G06K 9/36 | (2006.01) |
| G06K 7/10 | (2006.01) |
| G06K 9/20 | (2006.01) |
| G06K 9/34 | (2006.01) |
| G06K 9/32 | (2006.01) |
| G06K 9/46 | (2006.01) |
| G06K 9/66 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ........ 382/291; 382/180; 382/181; 382/190; 382/195; 382/203; 382/294; 382/292; 382/175; 382/177; 382/321; 715/221

(58) Field of Classification Search .................. 382/112, 382/173, 175, 180, 181, 290–292; 707/1–7; 715/221, 243, 247

See application file for complete search history.

(56) References Cited

U.S. PATENT DOCUMENTS

| 5,748,809 | A  | * | 5/1998  | Hirsch       | 382/317 |
| 6,910,182 | B2 | * | 6/2005  | Huang        | 715/239 |
| 7,613,996 | B2 | * | 11/2009 | Dallett et al. | 715/223 |

OTHER PUBLICATIONS

Cesarini et al. (INFORMys: A Flexible Invoice-Like Form-Reader System, IEEE Transactions on Pattern Analysis and Machine intelligence, vol. 20, No. 7, 1998, pp. 730-745.*

Ishitani (Document Transformation System from Papers to XML Data Based on Pivot XML Document Method, Proc $7^{th}$ (ICDAR 2003), pp. 1-6.*

Dergel (Making Documents Work: Challenges for Document Understanding, Proc 7th (ICDAR 2003).*

(Continued)

*Primary Examiner* — Tom Y Lu
*Assistant Examiner* — Thomas A Conway
(74) *Attorney, Agent, or Firm* — Fay Sharpe LLP

(57) ABSTRACT

A form reader includes a landmarks extractor configured to select textboxes of a converted document as form landmarks based on textual characteristics. A set of positional constraints constrain the form entries relative to the identified form landmarks. A constraints solver selects textboxes of the converted document as form entries by solving the set of positional constraints respective to a set of facts including the selected form landmarks and converted document. In some embodiments, the constraints solver includes a query engine configured to (i) construct a query in a logic programming language setting forth the set of positional constraints and the set of facts and to (ii) input said query to a logic programming language query solving engine and to (iii) receive a response from the query solving engine responsive to the input.

18 Claims, 3 Drawing Sheets

OTHER PUBLICATIONS

Breuel (High Performance Document Layout Analysis, Symposium on Document Imaging and Understanding Technology, 2003).*

Cesarini et al. (INFORMys: A Flexible Invoice-Like Form-Reader System, IEEE Transactions on Pattern Analysis and Machine intelligence, vol. 20, No. 7, 1998, pp. 730-745.*

Ishitani (Document Transformation System from Papers to XML Data Based on Pivot XML Document Method, Proc 7th (ICDAR 2003), pp. 1-6.*

Paradatec GmbH Technical Information, "Prosar-Aida: Al-based document analysis," pp. 1-3, 2002.

"Prolog," Wikipedia, pp. 1-11, at http://en.wikipedia.org/wiki/Prolog, on Jun. 15, 2006.

"What is SWI-Prolog?" 2 pp., at http://www.swi-prolog.org/home.html, on Jun. 20, 2006.

Allen, "Maintaining Knowledge about Temporal Intervals," Communications of the ACM, vol. 26, No. 11, pp. 832-843, 1983.

Breuel, "High Performance Document Layout Analysis," 2003 Symposium on Document Imaging and Understanding Technology, (2003).

U.S. Appl. No. 11/137,566, filed May 2005, Meunier.

Aiello et al., "Thick 2D Relations for Document Understanding," Technical Report #DIT-02-0063, pp. 1-32, 2002.

"OmniPage 15," Nuance, 2 pp., at http://www.nuance.com/omnipage/professional, on Jun. 20, 2006.

CambridgeDocs SNL Conversion Technologies, 3 pp., at http://www.cambridgedocs.com/, 2006.

Top Image Systems, Products, at http://www.topimagesystems.com/Page.asp?Par=3&id=24, on Jun. 20, 2006.

Dengel, "Making Documents Work: Challenges for Document Understanding," Proceedings of the Seventh International Conference on Document Analysis and Recognition (ICDAR 2003), IEEE Computer Society, 2003.

Dengel et al., "smartFIX: A Requirements-Driven System for Document Analysis and Understanding," DAS '02, (2002).

Koerich et al., "Large vocabulary off-line handwriting recognition: A survey," Pattern Anal Applic (2003) 6:97-121.

* cited by examiner

LANDMARK-BASED FORM READING WITH DECLARATIVE LANGUAGE

BACKGROUND

Businesses, industries, and other organizations such as real estate agencies, government agencies, corporations, and so forth typically have numerous standard forms that are used with regularity. For example, a real estate agent typically completes one or more forms for each real estate transaction, such forms including form entries for attributes of the property to be purchased, form entries about the buyer, form entries about the seller, and form entries for other relevant information about the transaction. Similarly, a corporation or other employer typically has job applicants or new hires complete various standard forms providing information such as name, address, employment position or position sought, contact information, and so forth.

The blank form is typically filled out by hand, using a typewriter, or using a computer. The completed form is typically signed by one or more authorized persons, and a completed and signed paper copy is sent to a central collection point (such as a central office of a real estate agency, or the office of human resources of a corporation or corporate division, or so forth) where the form entries are to be read into a suitable database. The form reading can be done manually, e.g., clerical staff can be provided to manually transcribe each form entry into the database. However, such a manual approach is inefficient and prone to human error.

Accordingly, automated reading of such completed forms is of interest for increasing efficiency and accuracy. One approach is to use standardized software for generating the completed form. For example, some word processing programs provide form capability including form entry dialog boxes that can be completed by an end-user. In such cases, the form entry dialog boxes are readily identifiable by the word processing program. However, this approach requires the use of a standardized software program or suite of programs by all persons or entities involved in generating completed forms. Such standardization is sometimes not achieved within a corporation or other organization. Moreover, if forms are completed by outside persons or entities, these outside persons or entities may use incompatible software. The form may also be printed out as a blank form that is completed by hand or using a typewriter.

To accommodate forms that are generated by different types of software or by hand or using a typewriter, it is convenient to process the completed forms as paper originals or copies. Technology exists to optically scan the completed form to generate a digital image, and to perform optical character recognition (OCR) to derive a text-based converted document from the scanned digital image. Off-line handwriting recognition software can operate analogously to OCR to convert handwritten form entries to textual content.

However, existing systems have difficulty in accurately identifying the form entries in the text-based converted document.

In one approach, the OCR text is divided into a textbox for each word, number, or other grouping of letters and/or number, and each textbox includes spatial coordinates of the text on the physical form page. The form entries are then identified based on their position on the form page as reflected by the spatial coordinates stored with each textbox. Errors in positioning the original paper document on the scanner can be corrected by registration processing that translates or rotates the scanned image prior to performing OCR. Such approaches are suitable when the form has a known layout which is precisely the same for each completed form.

In practice, however, the form layout may differ between completed forms, even when the original blank form is nominally identical. For example, different printing systems may use different fonts, different paper sizes, different pagination, or so forth which results in the different printed forms having differences in the spatial layout. Mechanical problems in the printing or scanning processes can also create discrepancies in the printed form layout. Still further, in some cases the blank form may be modified, either globally (e.g., an updated version of the form may be released with different "boilerplate" text that changes the layout), or locally (e.g., a local office may update the form to accord with local laws or other local circumstances, thus changing the layout). Even apparently small changes in the form layout can be problematic when form entries are identified based on spatial position on the page.

Thus, there remains an unfulfilled need for a form reader for processing scanned completed forms, which is robust against layout changes due to form revision updates, local versioning of the form, mechanical differences in printing of the blank form or scanning of the completed form, and so forth.

CROSS REFERENCE TO RELATED APPLICATIONS

The following U.S. patents and patent applications are commonly owned with the present application and are each incorporated herein by reference.

Meunier, U.S. patent application Ser. No. 11/137,566 filed May 26, 2005, entitled "Method and Apparatus for Determining Logical Document Structure" is incorporated herein by reference in its entirety. This application issued as U.S. Pat. No. 7,392,473 on Jun. 24, 2008, and relates at least to methods and apparatuses for text ordering in accordance with logical or reading text flow.

Vion-Dury, U.S. application Ser. No. 11/493,203 filed Jul. 26, 2006 (Xerox I.D. 20060022-US-NP) entitled "Graphical Syntax Analysis of Tables Through Tree Rewriting" is incorporated herein by reference in its entirety. This application published as U.S. Publ. Appl. No. 2008/0028291 A1 on Jan. 31, 2008, and relates at least to methods and apparatuses for determining table structure.

Hirsch, U.S. Pat. No. 5,748,809 issued May 5, 1998 entitled "Active Area Identification on a Machine Readable Form using Form Landmarks" is incorporated herein by reference in its entirety. This patent relates at least to identification of form entries based on graphic shape landmarks such as paragraphs of text, heavy black lines, and gray scale areas, of the document.

BRIEF DESCRIPTION

According to aspects illustrated herein, there are provided method and apparatus embodiments.

In one example embodiment, a form reader is disclosed. A converter receives a completed form and generates a converted document including textboxes each denoting text and corresponding spatial coordinates. A landmarks extractor is configured to identify a sub-set of the textboxes of the converted document as form landmarks. A positional constraints processor is configured to identify a sub-set of the textboxes of the converted document as form entries based on relative positions of the form entries respective to the form landmarks in the converted document.

In another example embodiment, a form reader is disclosed. A landmarks extractor is configured to select textboxes of a converted document as form landmarks based at least on textual characteristics. A set of positional constraints constrain the form entries relative to the identified form landmarks. A constraints solver selects textboxes of the converted document as form entries by solving the set of positional constraints respective to a set of facts including the selected form landmarks and the converted document.

In another example embodiment, a method of reading a form entries is disclosed. A completed form is converted into a set of textboxes each with associated spatial coordinates indicating the position of the text of the text box in the completed form. A sub-set of the textboxes are identified as form landmarks based on a combination of the text and spatial coordinates of the textboxes. Form entries are identified based on relative positioning of textboxes respective to the identified form landmarks in the converted document.

DETAILED DESCRIPTION

Figure 1:
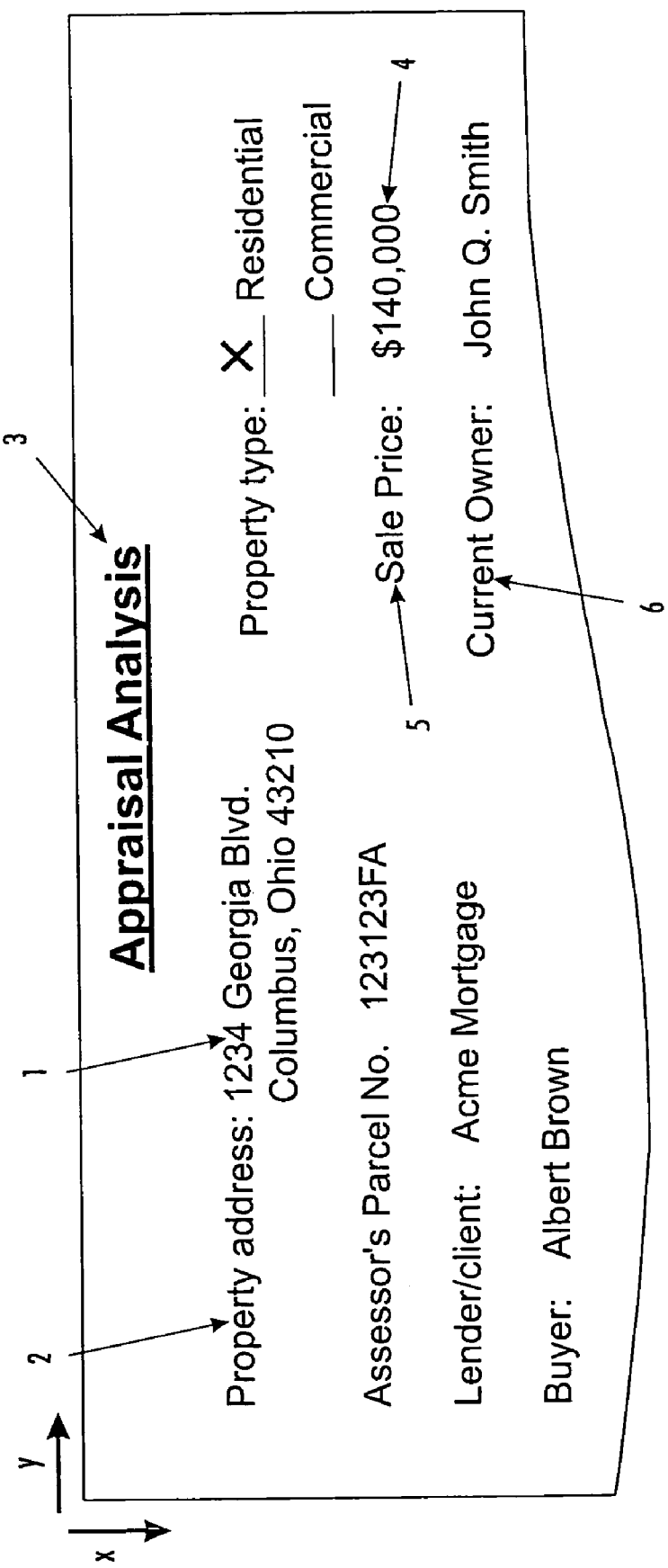
FIG. 1 shows a portion of a sample form, with several relative landmarks indicated.

With reference to FIG. 1, the example methods and apparatuses set forth herein identify form entries relative to the positions of landmarks in the form. For example, a property address form entry 1 is suitably located respective to a relative landmark "Property address:" 2 located to the left of the property address form entry 1 in the horizontal direction, and below a relative landmark "Appraisal Analysis" 3. Similarly, the sale price form entry 4 is suitably located respective to a relative landmark "Sale price:" 5 located to the left of the sale price form entry 4, and respective to a relative landmark "Current Owner:" 6 located below the sale price form entry 4. In general, it is advantageous to employ several landmarks in locating each form entry, that is, to overspecify the number of landmarks used to localize a form entry, so as to provide form landmarks that cross-validate each other.

In some embodiments, the relative location of a form entry respective to a landmark is given by one of the Allen temporal relations (Allen, "Maintaining Knowledge about Temporal Intervals", Communications of the ACM, pp. 832-43 (1983)) which gives a set of thirteen temporal relations (namely "Before", "After", "Meets", "MetBy", "Overlaps", "OverlappedBy", "Starts", "Started By", "Contains", "ContainedBy", "Ends", "EndedBy", and "Equals"), as adapted for two-dimensional spaces as set forth in Aiello et al., "Thick 2D Relations For Document Understanding", Technical Report #DIT-02-0063, University of Trento Department of Information and Communication Technology (2002). For example, the "Before" and "After" Allen temporal relations become "Before" and "After" in the horizontal direction as well as "Above" and "Below" in the vertical direction in the two-dimensional adaptation of Aiello. The approach of Aiello also allows for some flexibility in the relative positions by defining a threshold distance for equality. For example, an endpoint of one element may be deemed to be equal to a starting point of another document if the endpoint is within a threshold value of the starting point. Such a flexible thresholding or "thick boundary" approach is optionally incorporated into the positional relationships between form entries and landmarks. Moreover, a sub-set of the Aiello relations can be used, or other relative spatial relations can be used.

Figure 2:
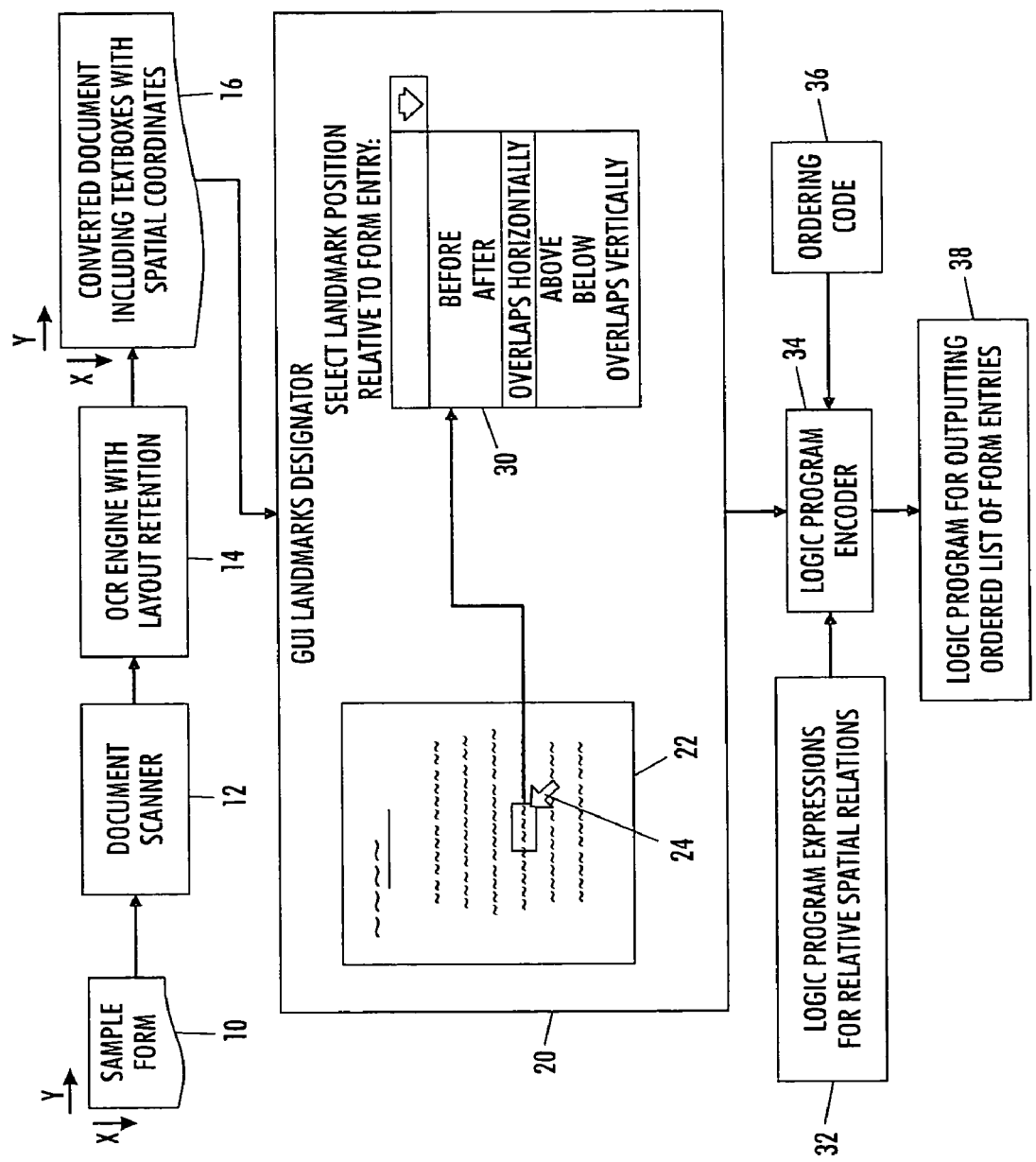
FIG. 2 diagrammatically shows a system for generating a set of positional constraints for locating form entries respective to form landmarks.

With reference to FIG. 2, a suitable approach for identifying form landmarks and a set of positional constraints constraining the form entries relative to the form landmarks is described. A sample form 10, which may be either a blank form or a completed form, is scanned by a document scanner 12 and processed by an optical character recognition (OCR) engine 14 that retains layout information. The OCR engine 14 outputs a converted document 16 including textboxes each denoting text and corresponding spatial coordinates. The converted document 16 is segmented into one or more pages, each of which have a certain width and height. Each page contains textboxes, that is, textual elements with some spatial coordinates on the page (for example, given as x- and y-coordinates as indicated diagrammatically in FIG. 1 around completed form 10 and corresponding converted document 16). In some embodiments, the document scanner 12 outputs each page of the document as an image in PDF format, and the OCR engine 14 suitably converts the image PDF to a text-based PDF and incorporates a PDF2XML converter such as CambridgeDocs (available from Ixiasoft, Montreal, Canada) or OmniPage Pro (available from Nuance, Burlington, Mass.). In some embodiments, the flow of text can be segmented at multiple levels, such as at the paragraph, or line, or word level, resulting in a hierarchy of nested textboxes.

In FIG. 1, the form landmarks are identified using a graphical user interface (GUI)-based landmarks designator 20, which shows a "what-you-see-is-what-you-get" (WYSIWYG) representation 22 of the converted document 16. A user can identify form landmarks and form entries in the WYSIWYG representation 22 using a mouse pointer 24 or other user input. (If the sample form 10 is a blank form, then the user suitably selects as the "form entry" the blank space on the form that is allocated for the form entry). The positional relationship between a form landmark and a form entry is suitably designated using a drop-down list dialog box 30 or other GUI dialog box that lists the positional relationships available for selection. Alternatively, the positional relationship can be automatically determined by the GUI-based landmarks designator 20 based on the relative position of a manually selected form landmark and a manually selected form entry in WYSIWYG representation 22 of the converted document 16.

As shown in the example drop-down list dialog box 30, a relatively limited number of positional relationships, such as horizontal relationships "before", "after", and "overlaps horizontally", and vertical relationships "above", "below" and "overlaps vertically", are sufficient to specify the relationship of a form entry relative to a landmark. More precise positional relationships are generally not advantageous, because more precise positional relationships are more likely to be invalidated by changes in the form such as form revisions, differences caused by different printing devices, and so forth. The limited number of positional relationships also makes automated determination of the relationship between a selected form entry and a selected form landmark straightforward. Thus, the dialog box 30 is optionally omitted in favor of automated determination of the relationship based on user selection of the form landmark and form entry.

A set of positional constraints is constructed corresponding to the identified positional relationships between the form entries and form landmarks. In a suitable embodiment, the set of positional constraints is expressed in the syntax of a logic programming language such as Prolog. The term "Prolog" as used herein is intended to encompass implementations of standard Prolog as well as Prolog-based languages that substantially implement standard Prolog but which include modifications and/or extensions to the standard language, such as omitting certain standard Prolog predicates or adding higher-order programming logic such as is supported by HiLog, λProlog, XSB, and the like. Thus, the term "Prolog" is intended to encompass, for example, SWI-Prolog, HiLog, λProlog, XSB, and the like. The term "logic programming language" is intended to encompass Prolog (including its variants such as HiLog, λProlog, XSB, and the like) as well as other programming languages that receive as input a set of logical constraints and facts and output a set of values that satisfy the set of logical constraints. Logic programming languages are typically invoked by sending a query including the set of logical constraints and a set of facts to a logic programming language query engine, which identifies the set of values satisfying the logical constraints.

In the system of FIG. 2, a set of logic program expressions for relative spatial relations 32 provides analogs to the positional constraints selectable via the dialog box 30 or by automated selection logic based on relative positioning of the form entry and form landmark. However, the logic program expressions 32 provide the analogous syntax in Prolog or another selected logic programming language for such relative spatial relations. In a suitable Prolog-based syntax, for example, a text box can be defined by a bounding box, denoted bb, given by:

$$bb(<id>,<text>,<x1>,<y1>,<x2>,<y2>) \quad (1),$$

where <id> is an XML node id, <text> is the text of the textbox, <x1>,<y1> denote the coordinates of the top-left corner of the textbox, and <x2>,<y2> denote the coordinates of the lower-right corner of the textbox.

To identify a textbox with a landmark, an exact textual identity can be used. However, it is advantageous to allow for some inexactness between the text expected for a form landmark and the text of the textbox, so as to allow for OCR errors and the like. For example, the following Prolog predicate can be used:

$$simil(I, T) :- bb(I,A, \_, \_, \_, \_), A \sim T \quad (2),$$

where I denotes the id of the textbox, A denotes the text of the textbox, T denotes the expected text for the form landmark, the underscore "_" denotes an anonymous variable in Prolog, and A~T denotes "A similar to T" where similarity is defined, for example, using a string-to-string distance such as the Levenshtein or edit distance, so as to tolerate a certain number of differences in proportion to the string lengths. For example, if the form landmark is expected to have the text "Sale price:", then the predicate simil(I, "Sale price:") may be satisfied by the bounding box bb(I,"Sale price:", _, _, _, _).

Optionally, the form landmarks can be further identified based on spatial constraints on the page. For example, the page can be vertically and/or horizontally partitioned in two halves, and the half in which the landmark should reside is specified as a constraint on the form landmark. A weak spatial constraint (e.g., to within a half-page rather than for example specifying position to within one centimeter) is advantageous to provide robustness against changes in the form due to form revisions, differences in printing devices, and so forth. Other constraints on the form landmarks are contemplated, such as constraints based on typographic properties of the text such as font, font size, font color, boldfacing, underscoring, or so forth. It is also contemplated to use natural language processing (NLP) or other techniques to identify the form landmarks.

The selected Aiello spatial relations, or other spatial relations, for indicating relative relationships between form entries and form landmarks are suitably encoded in the syntax of Prolog or another selected logic programming language. For example, the spatial relationship "A Before B" is suitably encoded as the Prolog predicate:

$$\begin{aligned} &precedesY(A, B) :- bb(A, \_, \_, \_, \_, Y2A), \\ &bb(B, \_, \_, Y1B, \_, \_), \\ &\quad Y2A<Y1B \end{aligned} \quad (3),$$

while the spatial relationship "Above" is suitably encoded as the Prolog predicate:

$$\begin{aligned} &precedesX(A, B) :- bb(A, \_, \_, \_, X2A, \_), \\ &bb(B, \_, X1B, \_, \_, \_), \\ &\quad X2A<X1B \end{aligned} \quad (4).$$

Equations (3) and (4) define the "Before" and "Above" spatial relationships, respectively, in a Prolog syntax. "After" and "Below" spatial relationships are also suitably implemented using the precedesY and precedesX predicates, by reversing the order of the arguments. In some embodiments, an "Overlaps horizontally" relationship is also provided, and is defined in Prolog syntax by:

$$\begin{aligned} &overlapsY(A, B) :- bb(A, \_, \_, Y1A, \_, Y2A), \\ &bb(B, \_, \_, Y1B, \_, Y2B), \\ &\quad min(Y2A, Y2B) > max(Y1A, Y1B) \end{aligned} \quad (5),$$

and an "Overlaps vertically" relationship is similarly defined in Prolog syntax by:

$$\begin{aligned} &overlapsX(A, B) :- bb(A, \_, X1A, \_, X2A, \_), \\ &bb(B, \_, X1B, \_, X2B, \_), \\ &\quad min(X2A, X2B) > max(X1A, X1B) \end{aligned} \quad (6).$$

In Equations (3)-(6), exact values are required; however, a flexible thresholding or "thick boundary" approach is optionally incorporated by, for example replacing X2A<X1B in Equation (4) by X2A<(X1B+Δ) where Δ is a threshold having a positive value greater than zero. The predicates of Equations (3)-(6) enable implementation of the six example relative spatial relationships "Above", "Below", "Before", "After", "Overlaps horizontally", and "Overlaps vertically", which are provided as options in the drop-down list of the user dialog 30. However, other, additional, or fewer spatial relationships can be employed.

Given the Prolog-formatted spatial relations 32, such as those of Equations (3)-(6), a logic program encoder 34 encodes each positional constraint on a form entry respective to a form landmark in the Prolog or other logic program syntax. Thus, for example, the positional constraint "L12 Before E15" where L12 denotes a form landmark and E15 denotes a form entry, is selectable using the dialog box 30 (or by automated selection logic based on relative positioning of the form entry and form landmark) and is encoded by the logic program encoder 34 as precedesY(L12,E15). A positional constraint such as "L13 After E15" is suitably encoded as precedesY(E15, L13). The positional constraint "L9

Above E16" where L9 denotes a form landmark and E16 denotes a form entry, is encoded as precedesX(L9,E16), and so forth.

The logic program produced by the logic program encoder 34 optionally includes logic programming language syntax incorporating the simil predicate to allow for OCR errors in identifying the landmarks. Thus, with reference back to FIG. 1, an example logic program portion for identifying the property address form entry 1 (that is, "1234 Georgia Blvd. Columbus, Ohio 43210" in the completed form shown in part in FIG. 1) may include (in Prolog syntax):

$$\text{Query q1(I, T, X1, Y1, X2, Y2) :- simil(L2, "Property address:"),}$$
$$\text{precedesY(L2, I), overlapsX(L2,I), simil(L3,"Appraisal Analysis"),}$$
$$\text{overlapsY(L3,I), precedesX(L3,I), bb(I, T, X1, Y1, X2, Y2)} \quad (7).$$

Equation (7) sets forth a query that specifies as spatial constraints that a form landmark L2 similar to "Property address:" precedes the form entry to be identified in the horizontal (Y) direction and overlaps the form entry to be identified in the vertical (X) direction, and that a form landmark L3 similar to "Appraisal Analysis" overlaps the form entry to be identified in the horizontal (Y) direction and precedes the form entry to be identified in the vertical (X) direction. The output of the query of Equation (7) is the textbox parameters I, T, X1, Y1, X2, and Y2 where I and T are the id and text, respectively, of the identified form entry, (X1,Y1) is the upper-left spatial boundary of the form entry textbox, and (X2,Y2) is the lower-right spatial boundary of the form entry textbox. In some embodiments, the output may be limited to the id and text, or to only the text.

Advantageously, the identification of form landmarks using the simil predicate and optional broad spatial constraints (e.g., within the top-half of the page, or on a specified page) tolerates some ambiguity. For example, in Equation (7) more than one textbox may satisfy the condition simil(L3, "Appraisal Analysis"), leading to more than one textbox that could correspond to the title "Appraisal Analysis" landmark. The designation can optionally be more precisely set forth by further including a spatial constraint, such as being in the top-half of the page. However, even if two or more textboxes satisfy the simil(L3,"Appraisal Analysis") constraint, the remaining constraints of Equation (7) are likely to ensure that the correct property address form entry 1 is identified. By overspecifying the number of spatial constraints for each form entry (for example, by using two or more form landmarks to specify each form entry), the preciseness of each landmark designation can be relaxed, providing robustness against OCR errors, repetitions of the landmark text in the completed form, or so forth.

In addition to positional constraints relating form entries with form landmarks, it is also contemplated to incorporate ordering constraints constraining an ordering of the form entries respective to one another. Such ordering constraints account for the possibility that the OCR engine 14 may not order the text of the converted document 16 in an expected order, such as the conventional reading flow order. Suitable ordering constraints can be implemented by ordering code 36 written in Prolog syntax. Example Prolog ordering code 36 set forth herein employs the following predicates:

$$\text{robefore(I1, I2) :- precedesY(I1, I2).}$$
$$\text{robefore(I1, I2) :- overlapsY(I1, I2), precedesX(I1, I2)} \quad (8),$$

which specify the condition for textbox I1 to be before textbox I2. The following bubble sort uses the predicate robefore orders the form entries:

$$\text{\% Order a list of textbox Id to the reading order determined}$$
$$\text{by the predicate robefore (note, the rule's order IS important)}$$
$$\text{rosort(Q, L, S) :- append(X, [A,B|Y], L), call(Q, B, A), !,}$$
$$\text{append(X, [B,A|Y], M), rosort(Q, M, S).}$$
$$\text{rosort(\_, L, L)} \quad (9).$$

Prolog programming code can also be generated by the logic programming encoder 34 to extract the text of each textbox and concatenate it so as to return the full text of the identified form entries:

$$\text{\% Convert a list of textbox Ids into a string by concatenating}$$
$$\text{all textbox text, with a space separator}$$
$$\text{totext([ ], [ ]).}$$
$$\text{totext([I|LI], T) :- bb(I, TI, \_, \_, \_, \_), append(TI, " ", TIS),}$$
$$\text{totext(LI, TLI), append(TIS, TLI, T)} \quad (10).$$

The Prolog programming code given in Equations (8)-(10) are glued by the logic program encoder 34 into a main functor that takes a query and returns a textual result for the query:

$$\text{\% The main functor}$$
$$\text{\% do a query (like q1, q3, q9, q), order its result,}$$
$$\text{convert it to text, display and return it in T}$$
$$\text{\% the reading order is line by line in this case}$$
$$\text{(because robefore is used here)}$$
$$\text{do(Q, T) :- lq(Q, L), rosort(robefore, L, S),}$$
$$\text{totext(S, T), nl, writef(T)} \quad (11),$$

where lq returns the list of Id values for each textbox:

$$\text{lq(Q, L):—setof(I, call(Q,I), L)} \quad (12).$$

The output of the logic program encoder 34 is a logic program 38 for outputting an ordered list of form entries.

Figure 3:
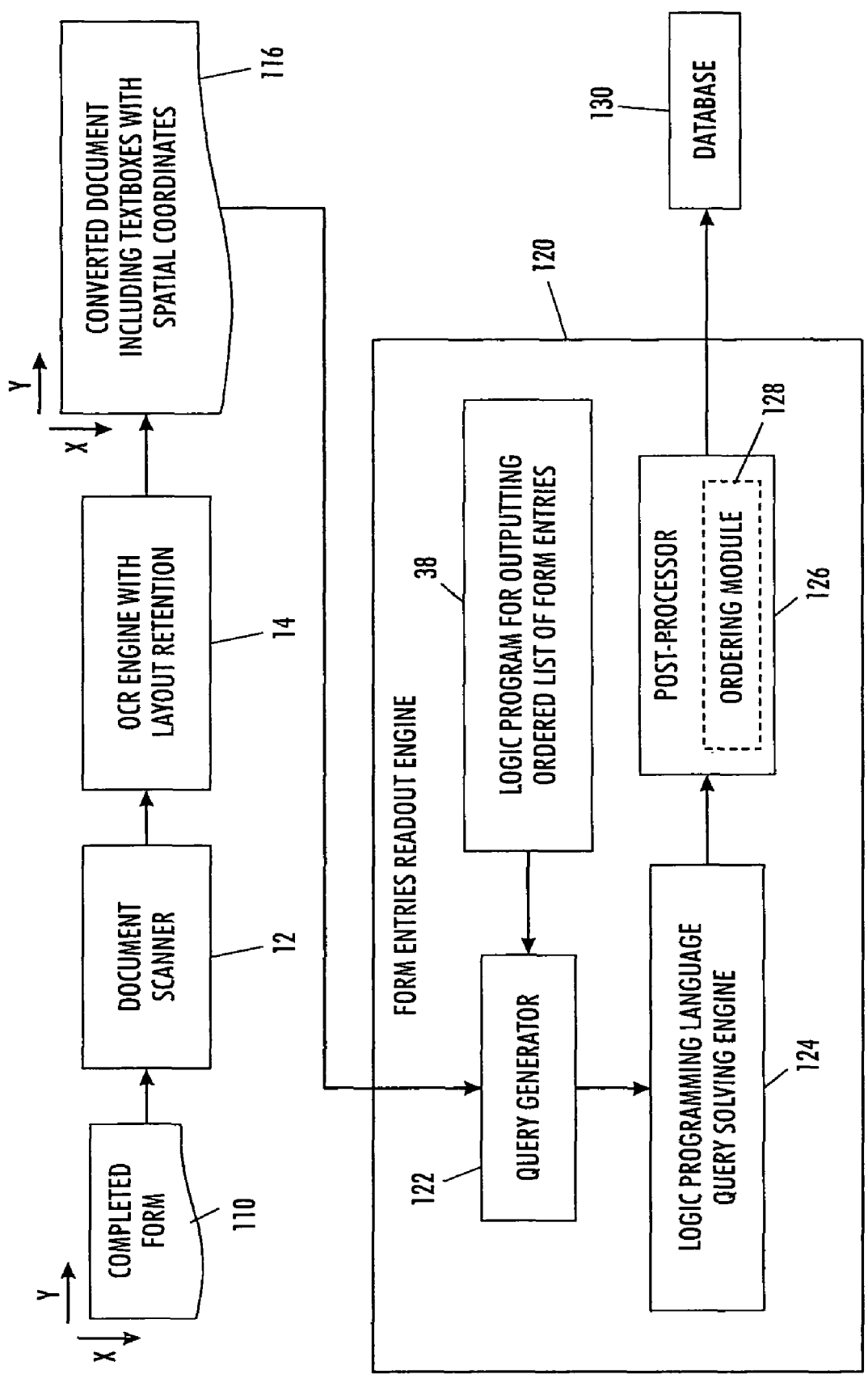
FIG. 3 diagrammatically shows a form reader which employs the set of positional constraints generated by the system of FIG. 1.

With reference to FIG. 3, the logic program 38 is used to identify form entries based on their relative positioning respective to the form landmarks identified using the system of FIG. 2. A completed form 110 to be read is processed in the same way as the sample completed form 10, that is, the completed form 110 is scanned by the document scanner 12 and processed by the OCR engine 14 that retains layout information, in order to produce a converted document 116 corresponding to the completed form 110 to be read, including textboxes each denoting text and corresponding spatial coordinates. Optionally, the OCR engine 14 incorporates off-line handwriting recognition software to convert any handwritten form entries to textual content. Although the same scanning and OCR components 12, 14 are shown in FIG. 3 as in FIG. 2, different components can be used that produce the resulting converted document 116 in the same format as the converted document 16 that was used to generate the logic program 38.

A form entries readout engine 120 employs the logic program 38 to identify the form entries. A query generator 122 generates a query in the logic programming language syntax, such as a Prolog query. The query generator 122 may be implemented in the logic programming language, or in another language. For example, in some embodiments the query generator is implemented in an object-oriented language such as Java, C++, or so forth. The logic programming language query is generated by combining the logic program 38 with facts extracted from the converted document 116. The facts are suitably expressed as bounding boxes as set forth in Equation (1).

In some embodiments, the query is decomposed into two parts: one to locate the landmarks, and one to extract the textual content of the form entries. For example, a suitable set of queries is:

$$q3\_landmarks(F1, F2, F3, F4) :- simil(F1, \text{``competitive''}),$$
$$simil(F2, \text{``prevalence''}), simil(F3, \text{``project''}), simil(F4, \text{``puds''}),$$
$$precedesX(F1, F2), OverlapsY(F1,F2),$$
$$precedesX(F3, F4), OverlapsY(F3,F4).$$
$$q3(I, T) :- q3\_landmarks(F1, \_, F3, \_),$$
$$precedesY(F1, I), precedesY(I, F3), token(I, T). \quad (13).$$

Decomposing the query of the logic program 38 between finding landmarks and finding form entries using the landmarks is useful because: (i) the landmark location query can be tested separately, to make sure it locates a correct set of landmarks on the form; and (ii) it can in some instances be used in the main query and a Prolog cut can be set after it so as to stop the search after the landmarks are found.

The resulting query (which may be a set of queries such as in Equation (13)) is input to a logic programming language query solving engine 124, such as a Prolog interpreter, which applies a suitable inference algorithm to identify textboxes that satisfy the positional constraints set forth in the logic program 38 respective to the facts derived from the converted document 116. These identified textboxes are the form entries. The query output is optionally further processed by a post-processor 126, which may be implemented in Java, C++, or another programming language, to perform selected operations such as spell-checking, tagging of form entries based on position in the ordering (for example, it may be known that the first form entry is the property address, the second form entry is the property type, and so forth), re-formatting of the form entries, parsing of the form entries, or so forth.

If the optional ordering code 36 (see FIG. 2) is included in the logic program 38, then the output of the Prolog interpreter or other query solving engine 124 will be ordered in accordance with the reading order.

Alternatively, as shown in FIG. 3, the post-processor 126 may include or implement an ordering module 128. In some embodiments, the ordering module 128 may implement the bubble sort of Equations (8)-(12) using an implementation that is not based on a logic programming language, such as Java. In some embodiments, the ordering module 128 may implement a re-ordering technique described in Aiello et al., "Thick 2D Relations For Document Understanding", Technical Report #DIT-02-0063, University of Trento Department of Information and Communication Technology (2002). In some embodiments, the ordering module 128 may implement a re-ordering technique described in Breuel, "High Performance Document Layout Analysis", 2003 Symposium of Document Imaging and Understanding Technology. In some embodiments, the ordering module 128 may implement a re-ordering technique described in Meunier, U.S. patent application Ser. No. 11/137,566 filed May 26, 2005, entitled "Method and Apparatus for Determining Logical Document Structure", which is incorporated herein by reference in its entirety.

The resulting ordered list of form entries are suitably stored in a database 130 or otherwise utilized.

An actually constructed form reader has been constructed in substantial accordance with the form reader embodiments disclosed herein, and has been tested on a real estate appraisal form. The test form was available as a PDF produced by an OCR engine. It was converted to XML with a PDF-to-XML converter. Word-sized textboxes were employed, since segmentation into larger units such as lines and paragraphs was found to have insufficient reproducibility amongst instances of the completed form. (This was an implementation choice—it is to be appreciated that depending upon the form being read, the OCR engine, and so forth, in some other implementations textboxes corresponding to lines, paragraphs, and other units that are larger than word-sized may be suitable). A tool written in Java generated the Prolog file, using facts expressed as bounding boxes in accordance with Equation (1). For the test form, this resulted in about 800 textboxes. Each fact includes the XML node Id, the textual content, and the coordinate of the top-left and bottom-right corners of its bounding box.

In the actually constructed implementation, the simil(<id>, <text>) predicate required exact agreement between the text of the textbox and the <text> specifying the form landmark. That is, no allowance for OCR errors was made in the actually constructed form reader. (Again, this is an implementation choice—it is expected that using the simil predicate to allow for some textual mismatch will provide improved robustness against OCR errors and the like). Twenty-one <text> values, namely: "information", "neighborhood", "prevalence", "description", "factors", "charges", "conclusions", "price", "support", "sale", "paid", "seller", "project", "amount", "market", "puds", "affect", "competitive", "data", "loan", and "appraiser", were used as form landmarks. Because some of these <text> values appeared more than once in the blank form, evaluating the simil(<id>, <text>) predicates over the 800 textboxes identified about forty-four simil facts per completed form.

The precedesX, precedesY, OverlapsX, and OverlapsY relative positional predicates substantially as set forth in Equations (3)-(6) were used in constructing the Prolog logic program. The Java virtual machine loaded the Prolog engine, which in turn loaded the facts and the logic program in about 0.1 second. A query executed from Java took about 0.01 seconds. The Prolog queries typically executed in less than 0.01 second with SWI-Prolog (available at http://www.swi-prolog.org).

The use of a logic programming language and syntax for expressing and evaluating the positional constraints has certain advantages. However, the positional constraints processor that evaluates the set of positional constraints constraining the form entries relative to the identified form landmarks may be implemented in other syntaxes or programming languages. For example, it is contemplated to employ an SQL database query language in SQL syntax, or an Xquery in XML query language syntax. The following Prolog query:

$$Query2(I) :- Simil(I1, \text{``B''}), precedesX(I, I1), overlapsY(I, I1),$$
$$Simil(I2, \text{``C''}), OverlapsX(I, I2), precedesY(I,I2). \quad (14),$$

can for example be approximated in SQL as:

```
SELECT DISTINCT BB.I
  FROM BB, BB AS BB1, BB AS BB2, Simil, Simil
    AS Simil1, Simil AS Simil2
  WHERE ( (BB1.I=Simil1.I) AND (Simil1.T="B") AND
    (BB1.x1>BB.x2) AND (BB1.y1=BB.y1) AND
    (BB2.I=Simil2.I) AND (Simil2.T="C") AND
    (BB2.x1=BB1.x1) AND (BB2.y1>BB1.y2));         (15).
```

The SELECT of Equation (15) includes two inner joins (between BB1 and Simil1 and between BB2 and Simil2), and then requires the engine to do the Cartesian product of BB with the two record sets produced by the inner joins.

The disclosed apparatuses and methods relating to form readers and form reading can be implemented in various ways. In some embodiments, an apparatus includes executable software running on one or more computers or other digital devices to implement the GUI-based landmarks designator 20, logic program encoder 34, form entries readout engine 120, or so forth. In some embodiments, a storage medium such as an optical disk, magnetic disk, magnetic tape, FLASH memory, random access memory (RAM), read-only-memory (ROM), network server data storage, or so forth stores instructions executable to perform or implement one or more embodiments of the GUI-based landmarks designator 20, logic program encoder 34, form entries readout engine 120, or so forth. These are merely example physical implementations—other physical implementations are also contemplated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory computer-readable storage medium storing instructions executable to implement a form reader comprising: a converter that receives a completed form and generates a converted document including textboxes each denoting text and corresponding spatial coordinates; a landmarks extractor configured to identify a sub-set of the textboxes of the converted document as form landmarks; and a positional constraints processor configured to identify a sub-set of the textboxes of the converted document as form entries based on relative positions of the form entries respective to the form landmarks in the converted document, the positional constraints processor comprising a query generator configured to generate a query constructed from a set of positional constraints including positional constraints constraining the form entries respective to the form landmarks and a set of facts including the form landmarks derived from the converted document, the query being formatted for input to a logic programming language query solving engine.

2. The non-transitory computer-readable storage medium as set forth in claim 1, wherein the landmarks extractor comprises: a string distance component that evaluates textual content of a textbox respective to a target landmark string; and a positional constraint component that evaluates spatial coordinates of a textbox respective to spatial coordinates of a target landmark.

3. The non-transitory computer-readable storage medium as set forth in claim 1, wherein the logic programming language query solving engine is configured to process a Prolog-formatted input.

4. The non-transitory computer-readable storage medium as set forth in claim 1, wherein each positional constraint of a form entry respective to a form landmark constrains the form entry respective to the form landmark in one of two orthogonal coordinate directions.

5. The non-transitory computer-readable storage medium as set forth in claim 1, further comprising: an ordering processor that orders the form entries output by the positional constraints processor based on a pre-determined text flow of the converted document.

6. The non-transitory computer-readable storage medium as set forth in claim 1, wherein the converter comprises: an optical character recognition (OCR) engine configured to convert a scanned document image to the converted document including the textboxes each denoting text and corresponding spatial coordinates.

7. The non-transitory computer-readable storage medium as set forth in claim 1, wherein the positional constraints processor further comprises: an ordering module generating constraints respective to an ordering of the form entries respective to one another.

8. The non-transitory computer-readable storage medium as set forth in claim 7, wherein the ordering module constrains the ordering of the form entries respective to one another to conform with a reading order of the converted document.

9. The non-transitory computer-readable storage medium as set forth in claim 1, wherein the landmarks extractor comprises: a graphical user interface (GUI) configured to receive manual selection of the sub-set of the textboxes of the converted document as form landmarks.

10. The non-transitory computer-readable storage medium as set forth in claim 9, wherein the GUI is further configured to receive manual selection of relative position constraints on the form entries respective to the form landmarks, the relative position constraints being used by the positional constraints processor to identify the sub-set of the textboxes of the converted document as form entries.

11. A form reader comprising:
  a converter that receives a completed form and generates a converted document including textboxes each denoting text and corresponding spatial coordinates;
  a landmarks extractor configured to identify a sub-set of the textboxes of the converted document as form landmarks, wherein the landmarks extractor is configured to select textboxes of the converted document as form landmarks based at least on textual characteristics; and
  a positional constraints processor configured to identify a sub-set of the textboxes of the converted document as form entries based on relative positions of the form entries respective to the form landmarks in the converted document, the positional constraints processor including a constraints solver that selects textboxes of the converted document as form entries by solving a set of positional constraints respective to a set of facts including the selected form landmarks and the converted document, the set of positional constraints including a set of positional constraints constraining the form entries relative to the identified form landmarks and ordering constraints constraining an ordering of the form entries;
  wherein the form reader is embodied as one or more digital devices executing software.

12. The form reader as set forth in claim 11, wherein the set of positional constraints includes constraints selected from a group consisting of:
- a selected text entry being constrained to be to the right of a selected landmark in a horizontal direction;
- a selected text entry being constrained to be to the left of a selected landmark in a horizontal direction;
- a selected text entry being constrained to be above a selected landmark in a vertical direction; and
- a selected text entry being constrained to be below a selected landmark in a vertical direction.

13. The form reader as set forth in claim 11, wherein the constraints solver comprises:
- a query engine configured to (i) construct a query in Prolog setting forth the set of positional constraints and the set of facts and to (ii) input said query to a Prolog query solving engine and to (iii) receive a response from the Prolog query solving engine responsive to the input.

14. The form reader as set forth in claim 11, wherein the landmarks extractor is configured to select textboxes of the converted document as form landmarks based on textual and positional characteristics.

15. The form reader as set forth in claim 11, wherein the constraints solver comprises:
- a query engine configured to (i) construct a query in a logic programming language setting forth the set of positional constraints and the set of facts and to (ii) input said query to a logic programming language query solving engine and to (iii) receive a response from the query solving engine responsive to the input.

16. The form reader as set forth in claim 15, wherein the constraints solver further comprises:
said logic programming language query solving engine.

17. A form reader comprising:
- a converter that receives a completed form and generates a converted document including textboxes each denoting text and corresponding spatial coordinates;
- a landmarks extractor configured to identify a sub-set of the textboxes of the converted document as form landmarks, wherein the landmarks extractor is configured to select textboxes of the converted document as form landmarks based at least on textual characteristics; and
- a positional constraints processor configured to identify a plurality of form entries comprising a sub-set of the textboxes of the converted document based on relative positions of the form entries respective to the form landmarks in the converted document, the positional constraints processor including a constraints solver that selects the plurality of form entries by applying an inference algorithm to solve a query that simultaneously embodies (i) a set of facts including the form landmarks of the converted document and (ii) a set of positional constraints constraining the form entries relative to the form landmarks;
- wherein the form reader is embodied as one or more digital devices executing software.

18. The form reader as set forth in claim 17, wherein the set of positional constraints further include ordering constraints constraining an ordering of the form entries.

* * * * *